United States Patent
Tanaka et al.

(10) Patent No.: US 8,094,986 B2
(45) Date of Patent: Jan. 10, 2012

(54) DOUBLE CLAD FIBER AND FIBER END PROCESSING METHOD, AND FIBER-COMBINER CONNECTING STRUCTURE INCLUDING THE SAME

(75) Inventors: Masatoshi Tanaka, Amagasaki (JP); Tetsuya Yamamoto, Amagasaki (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 463 days.

(21) Appl. No.: 12/271,688

(22) Filed: Nov. 14, 2008

(65) Prior Publication Data

US 2009/0129730 A1    May 21, 2009

(30) Foreign Application Priority Data

Nov. 16, 2007   (JP) ................................ 2007-298472

(51) Int. Cl.
  *G02B 6/255*   (2006.01)
  *H01S 3/00*    (2006.01)

(52) U.S. Cl. .............. 385/126; 385/27; 385/28; 385/29; 385/30; 385/31; 385/32; 385/42; 385/43; 385/44; 385/45; 385/46; 385/96; 385/122; 385/123; 385/124; 385/125; 385/127; 385/128; 359/333; 359/334; 359/341.1

(58) Field of Classification Search ................... 385/15, 385/27–32, 42–46, 96, 122–128; 359/333–334, 359/341.1
See application file for complete search history.

(56) References Cited

U.S. PATENT DOCUMENTS

| | | | | |
|---|---|---|---|---|
| 5,802,236 A * | 9/1998 | DiGiovanni et al. | ......... | 385/127 |
| 5,864,644 A * | 1/1999 | DiGiovanni et al. | ........... | 385/43 |
| 5,907,652 A | 5/1999 | DiGiovanni et al. | | |
| 5,966,490 A * | 10/1999 | Minns et al. | .................. | 385/127 |
| 5,999,673 A * | 12/1999 | Valentin et al. | .................. | 385/43 |
| 6,236,783 B1 * | 5/2001 | Mononobe et al. | ............. | 385/43 |
| 6,434,302 B1 * | 8/2002 | Fidric et al. | ..................... | 385/43 |
| 6,512,871 B2 * | 1/2003 | Kumel et al. | ................. | 385/123 |
| 6,535,665 B1 * | 3/2003 | Kim et al. | ........................ | 385/28 |
| 6,823,117 B2 * | 11/2004 | Vakili et al. | ..................... | 385/43 |
| 7,065,279 B2 * | 6/2006 | Shima et al. | .................. | 385/123 |
| 7,221,840 B2 * | 5/2007 | Vienne et al. | ................. | 385/126 |
| 7,280,728 B2 * | 10/2007 | Berkey et al. | ................. | 385/123 |
| 7,289,709 B2 * | 10/2007 | Folkenberg et al. | .......... | 385/126 |
| 7,327,922 B2 * | 2/2008 | Skovgaard et al. | ........... | 385/125 |
| 7,403,689 B2 * | 7/2008 | Koch et al. | .................... | 385/125 |
| 7,496,244 B2 * | 2/2009 | Berkey et al. | ..................... | 385/1 |
| 7,539,377 B2 * | 5/2009 | Gonthier | ......................... | 385/39 |
| 7,813,603 B2 * | 10/2010 | Nikolajsen | ..................... | 385/39 |
| 2004/0069019 A1 * | 4/2004 | Carter et al. | .................... | 65/414 |

FOREIGN PATENT DOCUMENTS

| | | |
|---|---|---|
| JP | 11142672 | 5/1999 |
| JP | 2005-070607 | 3/2005 |

* cited by examiner

*Primary Examiner* — Brian M. Healy
*Assistant Examiner* — Guy Anderson
(74) *Attorney, Agent, or Firm* — Lowe Graham Jones PLLC

(57) ABSTRACT

A double clad fiber includes a core, a first cladding provided so as to cover the core, and a second cladding provided so as to cover the first cladding. The second cladding has a plurality of pores extending in a length direction and arranged so as to surround the first cladding. In at least one fiber end, the second cladding has been removed by mechanical processing so that the at least one fiber end is formed by the core and the first cladding.

8 Claims, 5 Drawing Sheets

US 8,094,986 B2

DOUBLE CLAD FIBER AND FIBER END PROCESSING METHOD, AND FIBER-COMBINER CONNECTING STRUCTURE INCLUDING THE SAME

PRIORITY CLAIM

The present application claims priority from Japanese Patent Application No. 2007-298472 filed on Nov. 16, 2007 including the specification, drawings and claims, of which contents are herein incorporated by reference in its entirety for all purposes.

BACKGROUND OF THE INVENTION

The present disclosure generally relates to a double clad fiber including a core, a first cladding, and a second cladding, and having a plurality of pores formed in the second cladding, a fiber end processing method, and a fiber-combiner connecting structure including the same.

Double clad fibers have been widely used as optical fibers for use in a fiber laser and an optical amplifier.

A double clad fiber includes a core, a first cladding, and a second cladding, and the core is doped with rare earth elements to act as a light amplifying component. The first cladding has a lower refractive index than that of the core, and the second cladding has a lower refractive index than that of the first cladding. In such a double clad fiber, pumping light is introduced into the first cladding, the first cladding functioning as a multi-mode optical waveguide. The pumping light thus introduced is propagated through the double clad fiber while being repeatedly reflected at the interface between the first cladding and the second cladding. When passing through the core, the pumping light brings the rare earth elements added to dope the core into an inverted population state in which their outermost shell electrons are excited. Signal light that is propagated through the core is thus amplified by stimulated emission of the rare earth elements.

In some instances, an outer cladding layer is configured to advantageously define voids. For example, Japanese Laid-Open Patent Publication No. H11-142672 (Patent document 1) discloses a double clad fiber having large voids in an outer cladding layer and having a silica overcladding layer around the outer cladding layer.

In a double clad fiber, the following methods are generally used to introduce signal light into a core and to introduce pumping light into a first cladding. In one method, signal light and pumping light emitted from a light source is coupled into the core and first cladding of the double clad fiber by an optical collimating device such as a lens. In another method, a connection end of an optical coupler such as an optical combiner is fusion-spliced to an end face of the double clad fiber and the signal light and the pumping light are introduced from the other end of the optical coupler. The former method is disadvantageous because it requires time and labor to adjust respective optical axes of a pumping light source, an optical device, and a double clad fiber to optimally introduce light. The latter method is simpler and therefore desirable.

SUMMARY OF THE INVENTION

As shown in FIG. 6, however, in the case where an optical combiner C' is fusion-spliced to a double clad fiber F' having pores formed in a second cladding 13', the pores in the second cladding 13' collapse and disappear when a connecting end of the double clad fiber F' is heated. As a result, a pumping-light confining function is lost, causing leakage of pumping light in the joint portion and thus degrading a light amplifying function.

An objective of an example embodiment of the invention is to provide a double clad fiber capable of suppressing leakage of pumping light in a joint portion even when the double clad fiber is fusion-spliced to an optical combiner, and a fiber end processing method, and a fiber-combiner connecting structure including the same.

A double clad fiber according to an example embodiment of the invention which achieves the above objective includes: a core; a first cladding provided so as to cover the core; and a second cladding provided so as to cover the first cladding. The second cladding has a plurality of pores extending in a length direction and arranged so as to surround the first cladding. In at least one fiber end, the second cladding has been removed by mechanical processing so that the at least one fiber end is formed by the core and the first cladding.

A method for processing a fiber end of a double clad fiber according to an example embodiment of the invention is a method for processing a fiber end of a double clad fiber including a core, a first cladding provided so as to cover the core, and a second cladding provided so as to cover the first cladding and having a plurality of pores extending in a length direction and arranged so as to surround the first cladding. In at least one fiber end of the double clad fiber, a partition wall between the pores of the second cladding is destroyed by mechanical processing to remove the second cladding while leaving the core and the first cladding.

A fiber-combiner connecting structure according to an example embodiment of the invention includes: a double clad fiber including a core, a first cladding provided so as to cover the core, and a second cladding provided so as to cover the first cladding and having a plurality of pores extending in a lengthwise or axial direction and arranged so as to surround the first cladding; and an optical combiner fusion-spliced to one fiber end of the double clad fiber, having a signal light core and pumping light cores at a connecting end face so that the signal light core is connected to the core of the double clad fiber and the pumping light cores are connected to the first cladding of the double clad fiber. In the one fiber end of the double clad fiber having the optical combiner fusion-spliced thereto, the second cladding has been removed by mechanical processing so that the one fiber end is formed by the core and the first cladding.

BRIEF DESCRIPTION OF THE DRAWINGS

Other objectives and aspects of the invention will become apparent from the following description of embodiments with reference to the accompanying drawings in which.

DETAILED DESCRIPTION OF THE PREFERRED EMBODIMENT

Hereinafter, embodiments of the invention will be described in detail with reference to the accompanying drawings.

Double Clad Fiber

Figure 1:
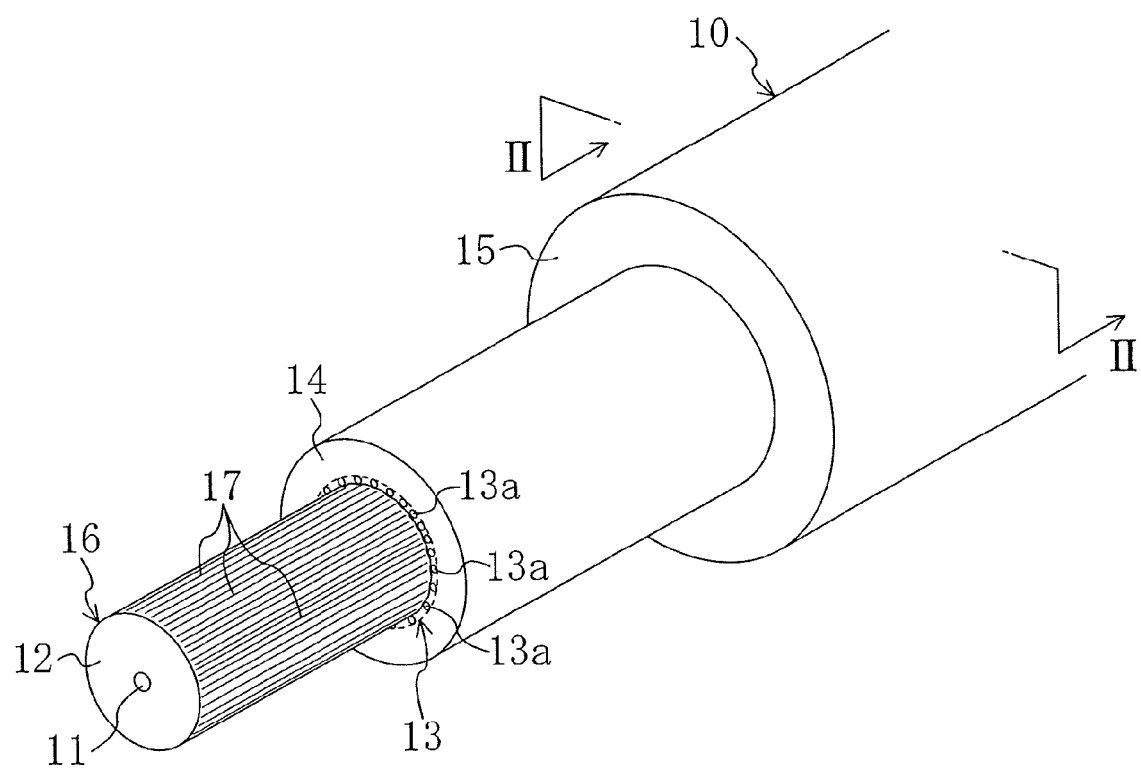
FIG. 1 is a perspective view of a double clad fiber according to an embodiment.
Figure 2:
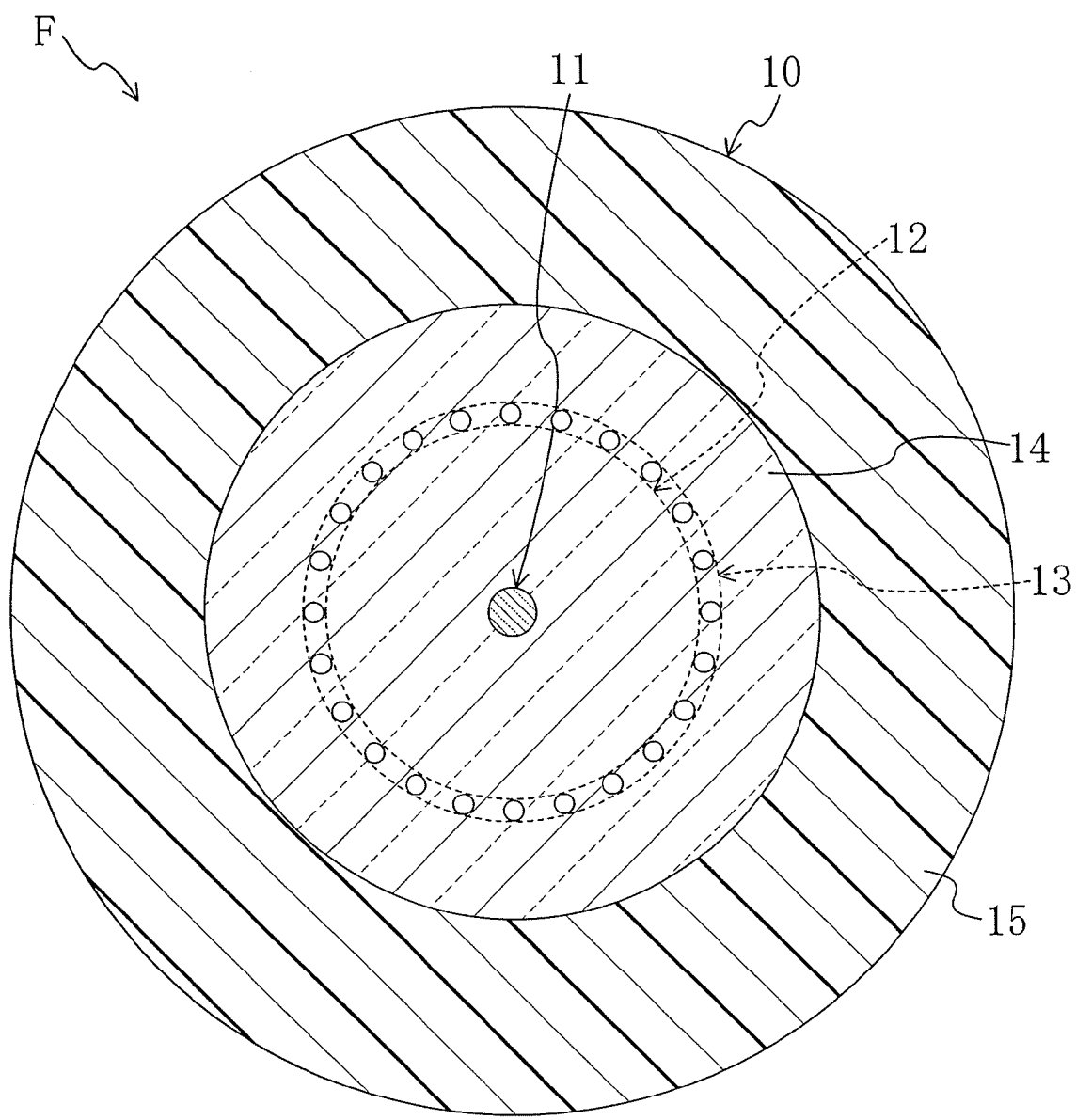
FIG. 2 is a cross-sectional view taken along line II-II in FIG. 1.

FIGS. 1 and 2 show a double clad fiber F. This double clad fiber F is used as an optical amplifier, a fiber laser, and the like.

The double clad fiber F is formed by a fiber body 10 and a covering layer 15 that covers the fiber body 10. The double clad fiber F has a length of, for example, 3 m to 50 m and a fiber diameter of, for example, 1,600 µm to 1,800 µm.

The fiber body 10 is formed by a core 11 as a fiber center, a first cladding 12 provided so as to cover the core 11, a second cladding 13 provided so as to cover the first cladding 12, and an overcladding 14 provided so as to cover the second cladding 13. The fiber body 10 has a body diameter of, for example, 600 µm to 700 µm.

The core 11 is made of, for example, quartz glass doped with any of the seventeen rare earth elements (namely scandium, yttrium, and the fifteen lanthanoids) such as ytterbium (Yb), erbium (Er), or neodymium (Nd) as an amplifying medium. The core 11 has a core diameter of, for example, 30 to 80 µm. The core 11 is doped with, for example, 5,000 ppm to 20,000 ppm of the rare earth elements and has a refractive index of, for example, about 1.448 for light having a wavelength of 1.31 µm. Note that the core 11 may further be doped with aluminum or the like in order to prevent concentration quenching caused by the rare earth elements. The core 11 may be doped with germanium or the like.

The first cladding 12 is made of a material having a lower refractive index than that of the core 11 made of, for example, quartz glass. The first cladding 12 has an outer diameter of, for example, 380 µm to 420 µm and a layer thickness of, for example, 160 µm to 180 µm. The first cladding 12 has a refractive index of, for example, about 1.447 for light having a wavelength of 1.31 µm.

The second cladding 13 is made of the same material as that of the first cladding 12 such as quartz glass. The second cladding 13 has an outer diameter of, for example, 430 µm to 470 µm and a layer thickness of, for example, about 20 µm to 30 µm.

Figure 3:
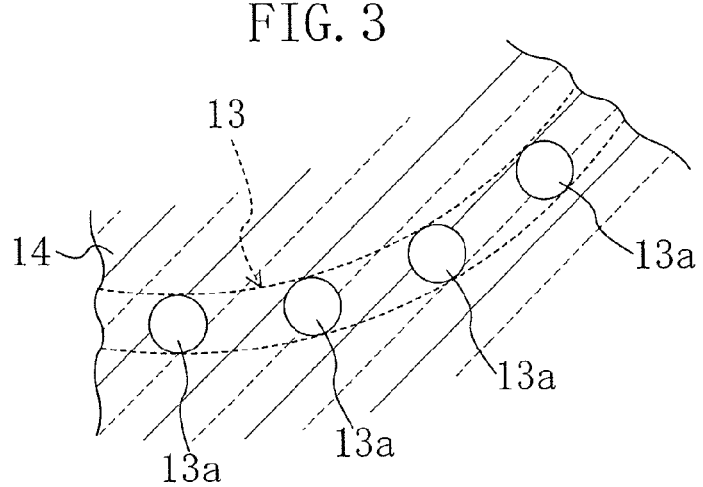
FIG. 3 is an enlarged cross-sectional view showing a main part of the double clad fiber.

As shown in FIG. 3, the second cladding 13 has a plurality of pores arranged so as to surround the first cladding 12. Each pore is formed so as to extend along the core 11 in a lengthwise or axial direction. The plurality of pores are formed at a pitch of 20 µm to 30 µm and the number of layers is 1 to 5. The plurality of pores have a pore diameter of, for example, 10 µm to 30 µm. A partition wall between adjacent pores has a wall thickness of, for example, 0.2 µm to 1 µm.

Since the plurality of axial pores are formed in the second cladding 13, the second cladding 13 has a structurally lowered refractive index. The effective refractive index of the second cladding 13 is, for example, about 1.357 for light having a wavelength of 1.31 µm.

The overcladding 14 is made of the same material as that of the first and second claddings 12, 13 such as quartz glass. The overcladding 14 has a layer thickness of, for example, 80 µm to 120 µm.

The covering layer 15 is made of, by way of non-limiting example, an ultraviolet curable resin, a silicon resin, a nylon resin, or the like. The covering layer 15 may be comprised of a single layer or a plurality of layers. The covering layer 15 has a layer thickness of, for example, 450 µm to 600 µm.

In the double clad fiber F, the second cladding 13 and the overcladding 14 are removed at its one fiber end 16 by mechanical processing. The fiber end 16 of the double clad fiber F is therefore formed by the core 11 and the first cladding 12. The portion in which the second cladding 13 and the overcladding 14 have been removed, define a plurality of grooves 17 on an outer peripheral surface of the second cladding 13. The grooves 17 have a circular arc-shaped cross section and extend in a lengthwise or axial direction. The grooves 17 are provided at intervals in a circumferential direction. These grooves 17 are impressions of the pores 13a of the second cladding 13. The grooves 17 may be removed by surface treatment such as heating and polishing. The portion in which the second cladding 13 and the overcladding 14 have been removed has a length of, for example, 10 mm to 40 mm.

For example, the following mechanical processing may be used to remove the second cladding 13 and the overcladding 14: the outer peripheral surface of the overcladding 14 is scratched at a predetermined length from a fiber end along the circumferential direction by a glass cutting tool. The portion from the scratched position to the end is then pulled in the lengthwise direction so as to peel off a portion of the second cladding 13, whereby the partition walls between the pores of the second cladding 13 are destroyed. For example, a cutter knife is used as the glass cutting tool.

In the fiber end 16 of such a double clad fiber F, the second cladding 13 and the overcladding 14 are removed by mechanical processing so that only the core 11 and the first cladding 12 are left. The fiber end 16 can thus be structured so that the first cladding 12 is covered by a low refractive-index air cladding made of an air layer.

Optical Combiner

Figure 4:
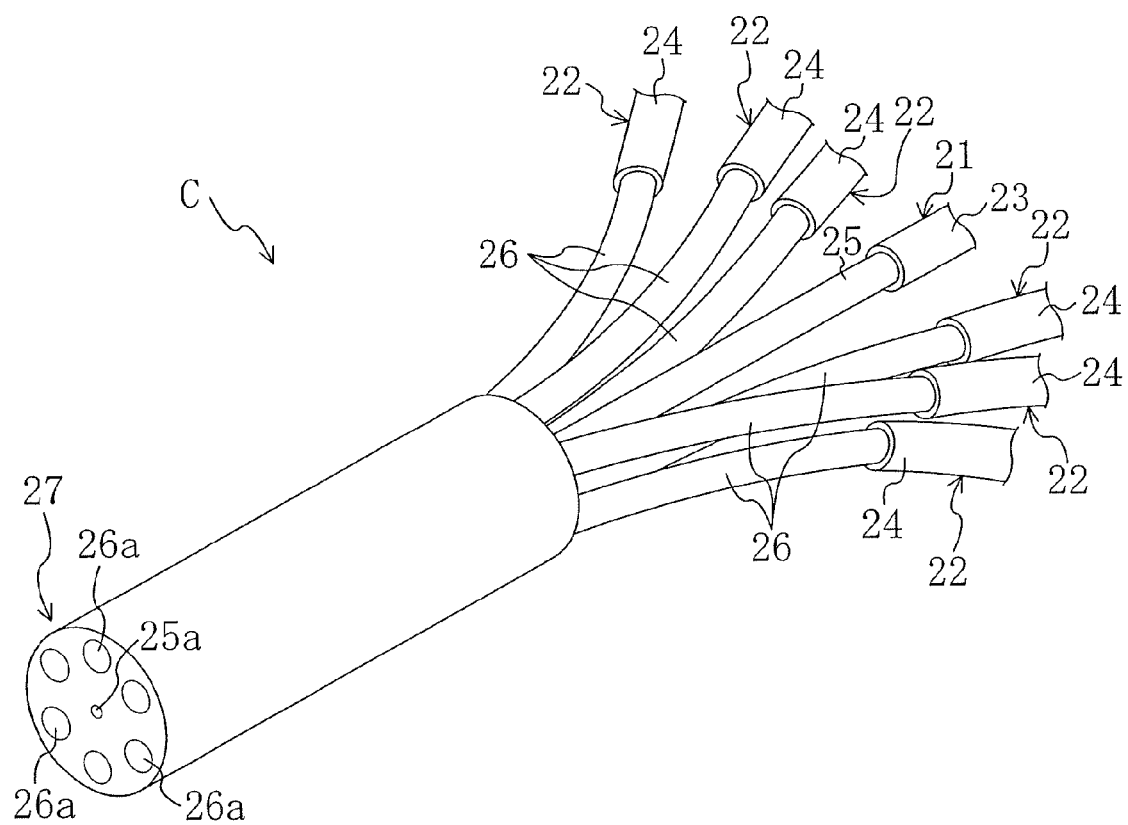
FIG. 4 is a perspective view of an optical combiner according to an embodiment.

FIG. 4 shows an optical combiner C according to an example embodiment.

This optical combiner C is formed by a signal optical fiber core wire 21 and a plurality of pumping optical fiber core wires 22. In each of the signal optical fiber core wire 21 and the plurality of pumping optical fiber core wires 22, a covering layer 23, 24 is peeled off by a predetermined length from an end of the fiber core wire so that a signal optical fiber 25 or a pumping optical fiber 26 is exposed. The signal optical fiber 25 and the plurality of pumping optical fibers 26 are bundled with the signal optical fiber 25 located in the middle, and are then fused together to form a connection end 27. The optical combiner C is formed in the connection end 27.

The signal optical fiber core wire 21 has the signal optical fiber 25 covered by the covering layer 23. The signal optical fiber core wire 21 has a total core wire length of, for example, 1 m to 10 m (including the connection end 27) and a core wire diameter of, for example, 240 µm to 260 µm.

The signal optical fiber 25 is made of, for example, quartz glass and has a high refractive-index signal light core 25a as a fiber center and a low refractive-index cladding that covers the signal light core 25a. The signal optical fiber 25 may have the signal light core 25a made of quartz doped with germanium or the like for an increased refractive index, and the cladding made of pure quartz. Alternatively, the signal optical fiber 25 may have the signal light core 25a made of pure quartz, and the cladding made of quartz doped with fluorine or the like for a reduced refractive index. The signal optical fiber 25 is generally formed as a single-mode fiber. The signal optical fiber 25 has a fiber length of, for example, 0.5 mm to 5 mm in the exposed portion with the covering layer 23 peeled off, a fiber diameter of 123 μm to 127 μm, and a core diameter of 10 μm to 60 μm.

The covering layer 23 is made of, for example, an ultraviolet curable resin, a silicon resin, a nylon resin, or the like. The covering layer 23 may be comprised of a single layer or a plurality of layers. The covering layer 23 has a layer thickness of, for example, 55 μm to 65 μm.

Each of the plurality of pumping optical fiber core wires 22 has the pumping optical fiber 26 covered by the covering layer 24. Each pumping optical fiber core wire 22 has a total core wire length of, for example, 1 m to 10 m (including the connection end 27) and a core wire diameter of, for example, 240 μm to 260 μm. For example, the number of pumping optical fiber core wires 22 is 3 to 10 (6 in FIG. 4).

Each pumping optical fiber 26 is made of, for example, quartz glass and has a high refractive-index pumping light core 26a as a fiber center and a low refractive-index cladding that covers the pumping light core 26a. Each pumping optical fiber 26 may have the pumping light core 26a made of quartz doped with germanium or the like for an increased refractive index, and the cladding made of pure quartz. Alternatively, each pumping optical fiber 26 may have the pumping light core 26a made of pure quartz, and the cladding made of quartz doped with fluorine or the like for a reduced refractive index. Each pumping optical fiber 26 is generally formed as a multimode fiber. Each pumping optical fiber 26 has a fiber length of, for example, 0.5 mm to 5 mm in the exposed portion with the covering layer 24 peeled off, a fiber diameter of, for example, 123 μm to 127 μm, and a core diameter of, for example, 80 μm to 115 μm.

The plurality of pumping optical fibers 26 may have the same fiber diameter or may have different fiber diameters from each other. The plurality of pumping optical fibers 26 may have the same core diameter or may have different core diameters from each other.

Each covering layer 24 is made of, for example, an ultraviolet curable resin, a silicon resin, a nylon resin, or the like. Each covering layer 24 may be comprised of a single layer or a plurality of layers. Each covering layer 24 has a layer thickness of, for example, 55 μm to 65 μm.

The signal optical fiber 25 and the plurality of pumping optical fibers 26 are integrated in the connection end 27. The signal light core 25a of the signal optical fiber 25 and the respective pumping light cores 26a of the plurality of pumping optical fibers 26 extend in the length direction in the connection end 27. Core arrangement having the signal light core 25a of the signal optical fiber 25 positioned in the middle and the respective pumping light cores 26a of the plurality of pumping optical fibers 26 positioned so as to surround the signal light core 25a is exposed at an end face of the connection end 27. The connection end 27 has an outer diameter of, for example, 370 μm to 430 μm. It is preferable that the outer diameter of the connection end 27 is approximately the same as, or slightly smaller than, that of the first cladding 12 of the double clad fiber F.

Fiber-Combiner Connecting Structure

Figure 5:
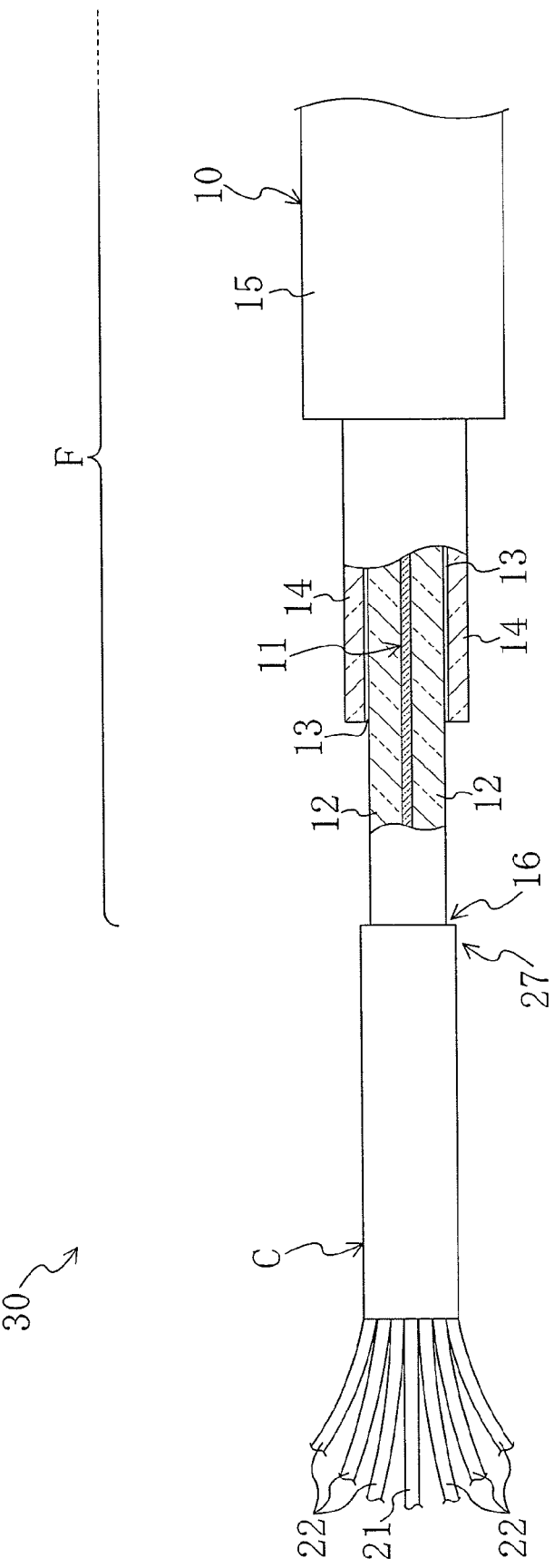
FIG. 5 is a longitudinal cross section of a fiber-combiner connecting structure.
Figure 6:
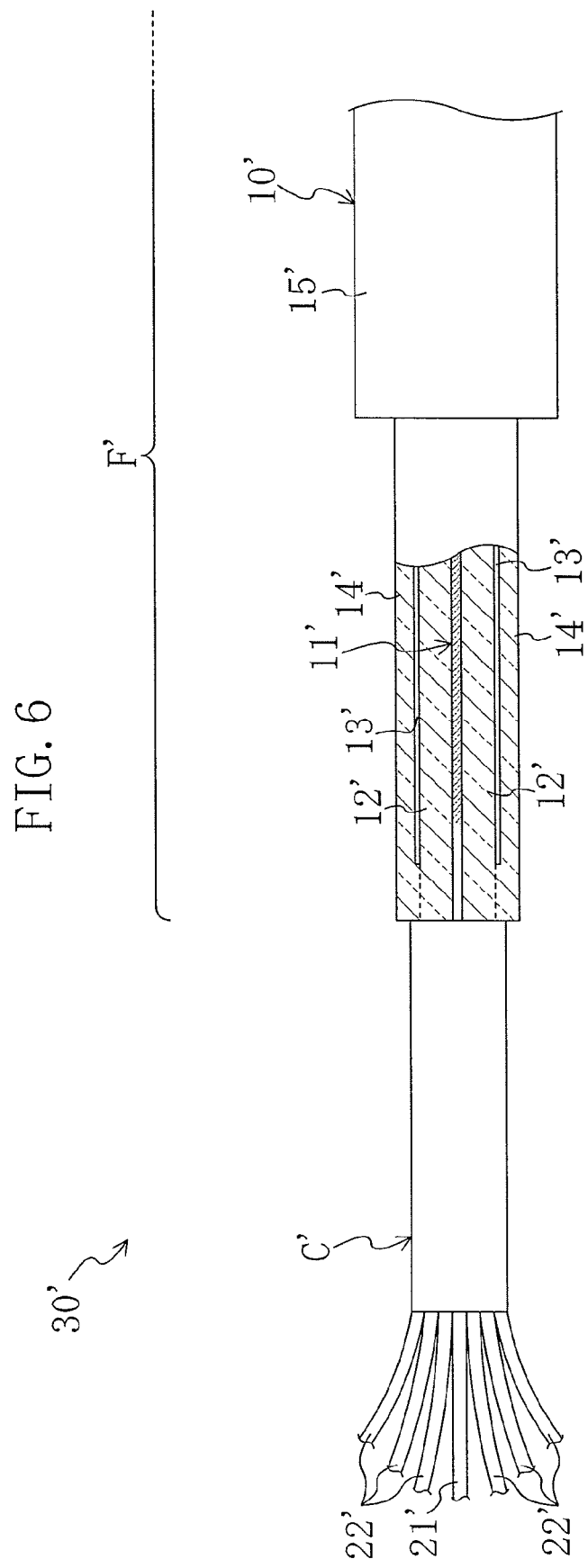
FIG. 6 is a longitudinal cross section of a conventional fiber-combiner connecting structure.

FIG. 5 shows a fiber-combiner connecting structure 30 according to an example embodiment.

The fiber-combiner connecting structure 30 is formed by fusion-splicing the fiber end 16 of the double clad fiber F and the connection end 27 of the optical combiner C by arc discharge or the like. As described above, the second cladding 13 and the overcladding 14 in the fiber end 16 of the double clad fiber F have been removed by mechanical processing, and the fiber end 16 is therefore formed by the core 11 and the first cladding 12.

In the joint portion of the fiber-combiner connecting structure 30, the fiber end 16 of the double clad fiber F does not have the second cladding 13 and the overcladding 14 and the first cladding 12 of the fiber end 16 is covered by a low refractive-index air cladding made of an air layer. Note that the first cladding 12 may be covered by another low refractive-index material. In the fiber-combiner connecting structure 30, the signal light core 25a of the optical combiner C is connected to the core 11 of the double clad fiber F and the pumping light cores 26a of the optical combiner C are connected to the first cladding 12 of the double clad fiber F.

In this fiber-combiner connecting structure 30, the signal optical fiber 25 and the pumping optical fibers 26 of the optical combiner C are connected to a signal light source and a pumping light source, respectively. Signal light from the signal light source is introduced into the core 11 of the double clad fiber F through the signal optical fiber 25 and pumping light from the pumping light source is introduced into the first cladding 12 of the double clad fiber F through the pumping optical fibers 26.

In the fiber end 16 of the double clad fiber F, the first cladding 12 is covered by a low refractive-index air cladding made of an air layer. Accordingly, the pores in the second cladding 13 will not collapse and disappear and therefore a pumping-light confining function will not be lost. In the joint portion as well, the first cladding 12 is covered by the low refractive-index layer and the pumping-light confining function works effectively. As a result, leakage of the pumping light can be suppressed.

Beyond the fiber end 16 of the double clad fiber F, pumping light introduced into the first cladding 12 is propagated through the region surrounded by the second cladding 13 while being repeatedly reflected at the interface between the first cladding 12 and the second cladding 13. When passing through the core 11, the pumping light brings the rare earth elements added to the core 11 into an inverted population state of in which their outermost shell electrons are excited. The signal light that is propagated through the core 11 is amplified by stimulated emission of the rare earth elements.

The double clad fiber according to the example embodiment of the present invention is not limited to the embodiment described above, and may be used in the case where the double clad fiber is fusion-spliced to an optical device other than the optical combiner, such as an optical coupler and an optical branching device. In this case as well, the same effects as those described above can be obtained.

The description of the embodiments of the present invention is given above for the understanding of the present invention. It will be understood that the invention is not limited to the particular embodiments described herein, but is capable of various modifications, rearrangements, and substitutions as will now become apparent to those skilled in the art without departing from the scope of the invention. Therefore, it is intended that the following claims cover all such modifications and changes as fall within the true spirit and scope of the invention.

The embodiments of the invention in which an exclusive property or privilege is claimed are defined as follows:

1. A double clad optical fiber, comprising: a core; a first cladding provided so as to cover the core; and a second cladding provided so as to cover the first cladding and defining a plurality of pores extending lengthwise and arranged so an equal number of partition walls separate the pores so as to surround the first cladding, wherein in at least one fiber end, a portion of at least one partition wall has been removed by mechanical processing so that the at least one fiber end is formed by the core being exposed along with an outer peripheral surface of the first cladding to form at least one groove in the second cladding corresponding to the pores adjacent to the removed segment of the partition wall.

2. The double clad fiber of claim 1, the second cladding including:
an overcladding of the second cladding material provided so as to cover the pores.

3. A method for forming a fiber end on a double clad optical fiber including a core, a first cladding provided so as to cover the core, and a second cladding provided so as to cover the first cladding, the second cladding defining by formed partition walls a plurality of pores extending lengthwise and arranged so as to surround the first cladding, wherein:
mechanically removing second cladding situated between two adjacent pores in at least one fiber end of the double clad optical fiber, while leaving the core and the first cladding to form at least one groove in the second cladding corresponding to the pores adjacent to the removed segment of the partition wall.

4. The method of claim 3, wherein the second cladding is deposited on the first cladding by overcladding so as to cover the pores and mechanically removing comprises:
scratching to remove an outer peripheral surface of the second cladding; and
destroying a segment of the partition walls between the pores by applying an external force along the site of the scratching so as to peel off a portion of the second cladding in proximity to the one fiber end.

5. A fiber-combiner connecting structure, comprising:
a double clad fiber including:
a core,
a first cladding provided so as to cover the core; and
a second cladding provided so as to cover the first cladding and defining by partition walls a plurality of pores extending lengthwise and arranged as to surround the first cladding; and
an optical combiner fusion-spliced to one fiber end of the double clad optical fiber having a signal light core an pumping light cores at a connecting end face so that the signal light core is connected to the core and the pumping light cores are connected to the first cladding of the double clad optical fiber;
wherein, at the one fiber end of the double clad optical fiber having the optical combiner fusion-spliced thereto, the a portion of the partition wall has been removed by mechanical processing so that the one fiber end is formed by the core and an end portion of the an outer peripheral surface of the first cladding from which the partition wall has been removed to form grooves.

6. The fiber-combiner connecting structure of claim 5, wherein the mechanical processing includes:
scratching an outer peripheral surface of an overcladding; and
destroying partition walls between the pores by applying an external force from the scratched position so as to peel off a portion of the second cladding closer to the one fiber end.

7. A method for processing a fiber end of the double clad optical fiber, the optical fiber including a core, a first cladding provided so as to cover the core, and a second cladding provided so as to cover the first cladding and defining a plurality of pores extending lengthwise formed by partition walls and arranged so as to surround the first cladding, wherein,
at least one fiber end of the double clad optical fiber, removing a partition wall between the pores of the second cladding by mechanical processing while leaving the core and the first cladding, the removing forming grooves corresponding to a portion of the pores and such of the partition wall as has been removed in an end portion of an outer peripheral surface thereof.

8. The method for processing a fiber end of a double clad optical fiber of claim 7, wherein the mechanical processing includes:
scratching an outer peripheral surface of an overcladding; and
destroying partition wall between the pores by applying an external force from the scratched position so as to peel off a portion of the overcladding and second cladding closer to the one fiber end.

* * * * *